United States Patent [19]

Goldwater

[11] Patent Number: 4,684,817
[45] Date of Patent: Aug. 4, 1987

[54] VALVULAR SAIL POWER PLANT

[76] Inventor: John M. Goldwater, 119 W. Taylor, Hobbs, N. Mex. 88240

[21] Appl. No.: 710,499

[22] Filed: Mar. 11, 1985

Related U.S. Application Data

Substitution of Ser. No. 621,206, Aug. 23, 1984, abandoned, which is a continuation of Ser. No. 313,576, Oct. 21, 1981, abandoned.

[51] Int. Cl.$^4$ .................... F03B 3/14; F03D 3/00; F03D 9/02
[52] U.S. Cl. ........................................ 290/55; 416/49
[58] Field of Search ................... 290/43, 44, 54, 55; 416/85, 86, 117, 119, 132, 143, 144

[56] References Cited

U.S. PATENT DOCUMENTS

| | | | |
|---|---|---|---|
| 206,631 | 7/1978 | Smith | 416/117 |
| 387,102 | 7/1888 | Nagel | 416/119 |
| 556,396 | 3/1896 | Auld | 416/132 |
| 588,143 | 8/1897 | Hall | 416/119 |
| 665,810 | 1/1901 | Stretch | 290/55 |
| 757,800 | 4/1904 | Williams | 290/55 |
| 921,940 | 5/1909 | Atkinson | 416/119 |
| 933,905 | 9/1909 | Igatz | 60/398 |
| 1,046,026 | 12/1912 | Salisbury | 416/86 |
| 1,334,485 | 3/1920 | Clipfell et al. | 290/55 |
| 1,602,853 | 10/1926 | Maher | 416/197 |
| 1,649,644 | 11/1926 | Alexeef | 415/2 |
| 1,804,493 | 5/1931 | Benjamins | 416/119 |
| 2,094,603 | 10/1937 | Keeng | 416/119 |
| 2,319,286 | 5/1943 | Andresen | 416/132 |
| 2,669,309 | 2/1954 | Akrg | 416/119 |
| 2,677,344 | 5/1954 | Annis | 416/240 A |
| 3,995,170 | 11/1976 | Graybill | 290/44 |
| 4,047,834 | 9/1977 | Magoveny et al. | 290/55 |
| 4,048,947 | 9/1977 | Sicard | 290/55 |
| 4,061,926 | 12/1977 | Reed | 290/55 |
| 4,191,507 | 3/1980 | DeBerg | 416/117 |
| 4,408,855 | 10/1983 | Wagle et al. | 416/119 |

FOREIGN PATENT DOCUMENTS

| | | | |
|---|---|---|---|
| 939847 | 5/1949 | France | 416/240 |
| 16146 | 2/1978 | Japan | 416/119 |
| 709201 | 5/1954 | United Kingdom | 416/119 |
| 2002064 | 2/1979 | United Kingdom | 416/132 |

Primary Examiner—William M. Shoop, Jr.
Assistant Examiner—W. E. Duncanson, Jr.

[57] ABSTRACT

A windmill generally intended to rotate in a horizontal plane about a vertical axis, includes essentially radial vanes; each which is effectively a one way valve respective to air flow; each which can enhance (or supplement) the beneficial actions of the others; and each of which vanes, in operation, effectively simulates a sailing vessel navigating a circular course in wind of constant direction. Each of said vanes includes a framework which supports a grid, which grid is the supporting means for a plurality of pivotally connected vertically aligned and overlapping light weight flexible sails, which sails are automatically rotated about said pivotal connection by the force of the wind into positions promoting the revolution of the windmill. Included with said sails are various devices as spars, springs and cords which promote and enhance their efficient automatic operation. The windmill is inherently self protecting in high winds and self regulating in speed of rotation. The windmill is shown in several embodiments and means of mounting, including which can utilize already existing structures for height and support and which float upon a body of water. Also shown are several means utilizing this invention to efficiently and inexpensively drive electrical generators, or alternators now used in automobiles, at high RPM without need of a separate step-up transmission. Discussed also is the interfacing of the electrical power generated with the existing electrical utility power lines. The windmill is shown in sizes which range from very large, for electrical generation on a commercial scale, to small sizes which can be mounted upon the roof of a household for providing electrical power directly and solely thereto. Also discussed is the use of this invention (or appropriateness) in less technologically developed, remote, or areas otherwise deficient in energy resources. Also discloses is the use of this invention to better propell sailing vessels.

26 Claims, 26 Drawing Figures

FIG. 9
FIG. 10
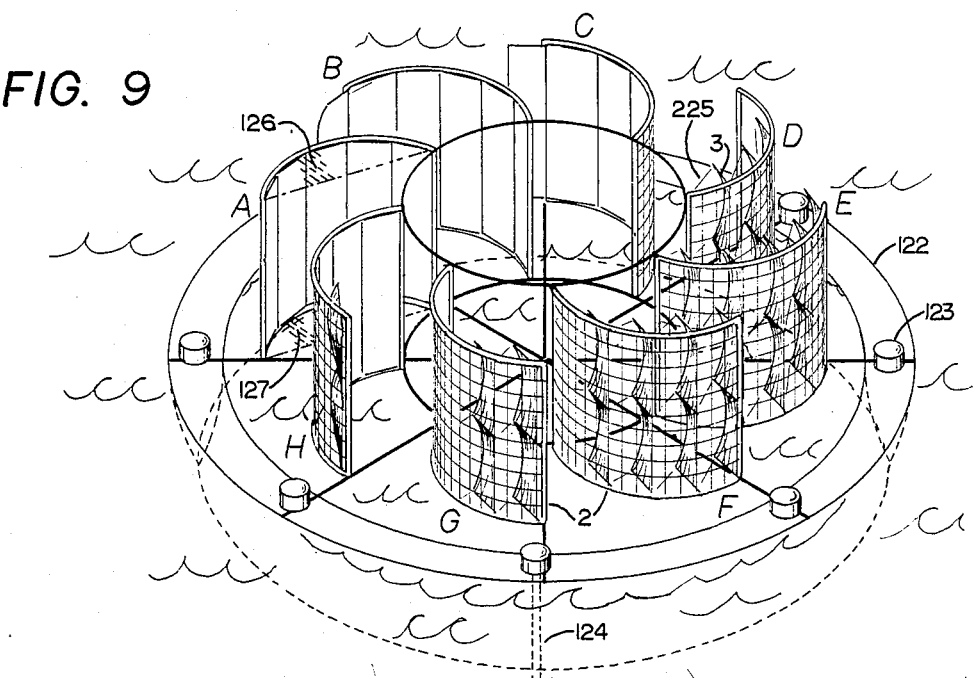
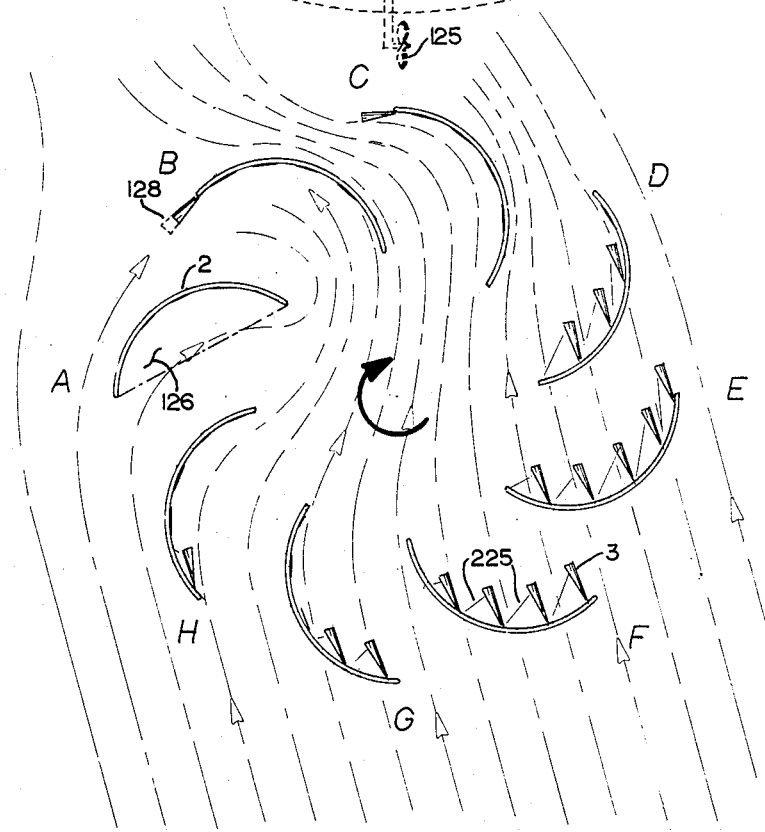

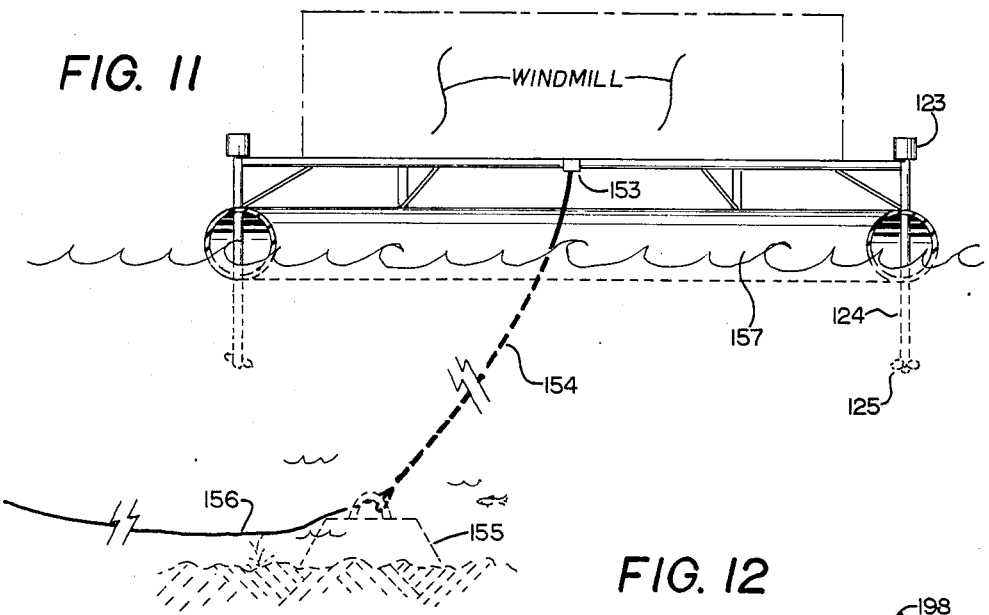
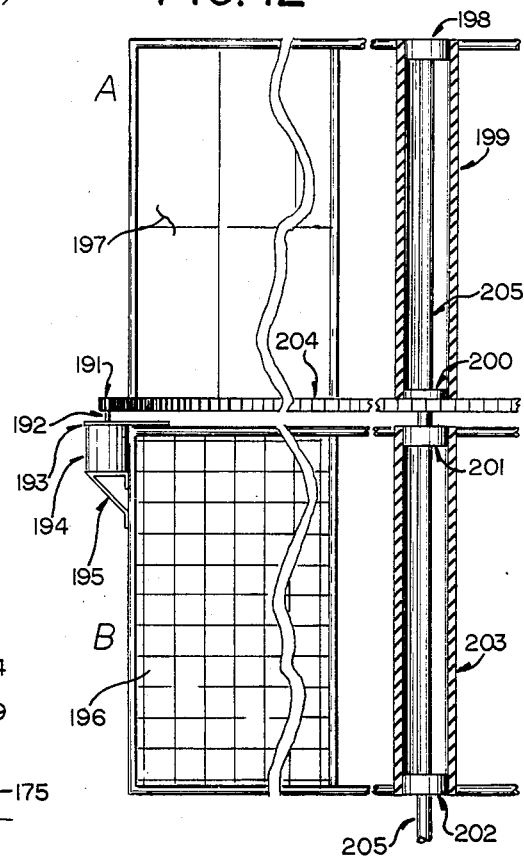
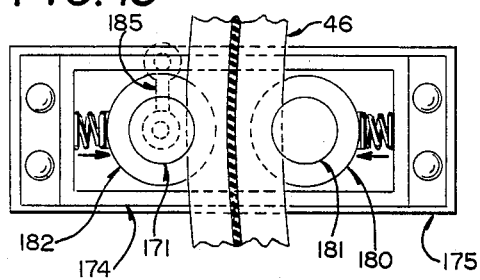
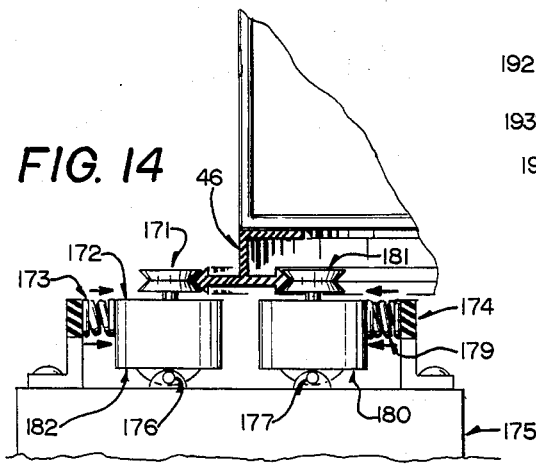

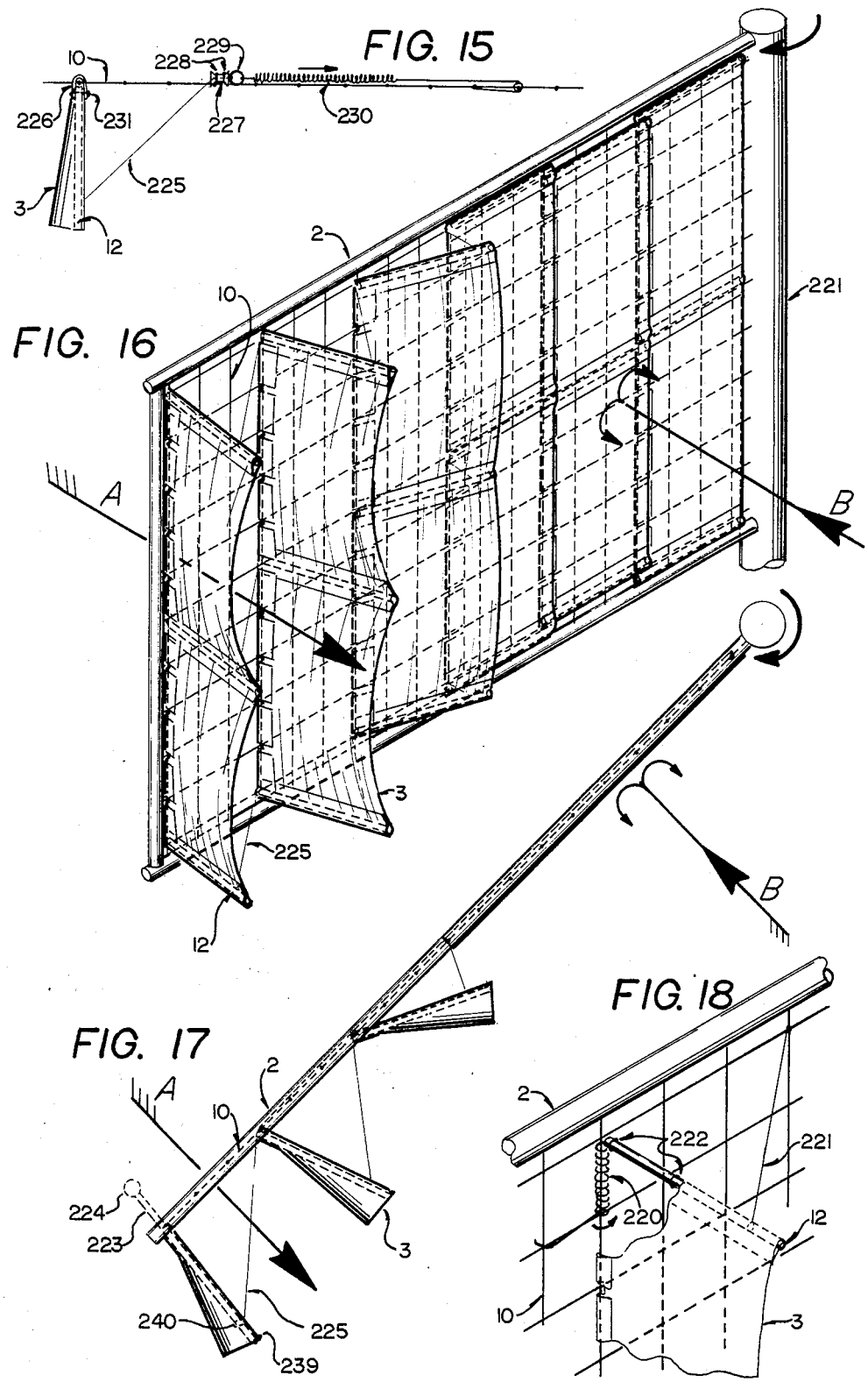

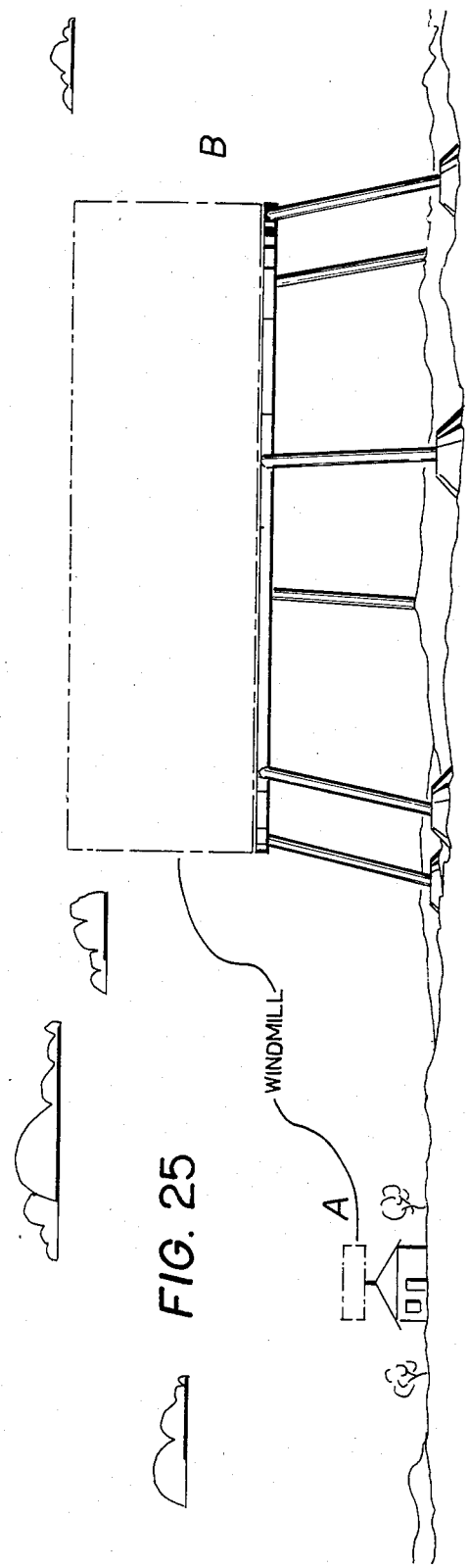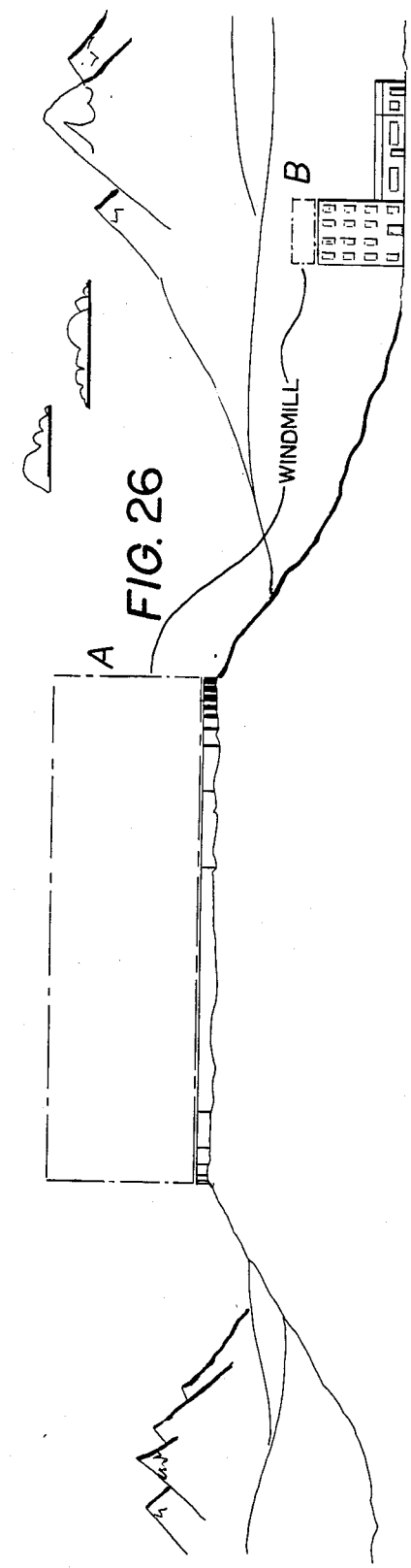

VALVULAR SAIL POWER PLANT

This is a substitution of application Ser. No. 621,206 filed 08/23/84, now abandoned, which was a continuation of Ser. No. 313,576, filed 10/21/81, now abandoned.

This invention relates to improvements in windmills and the means of utilizing the torque therefrom and particularly to windmills of the general type usually intended to rotate in a horizontal plane about a vertical axis; more specifically which utilize wind responsive surfaces which are continously reorientated as the windmill rotates. It relates to such windmills which are primarily intended for generating electrical power and additionally to such windmills which can more successively utilize already existing structures for height and support. Additionally it relates to such windmills which can be mounted on the roof of an average household to provide all, or a substantial part, of the power thereto. Additionally it relates to such windmills constructed very large in size and intended for more centralized or commercial use of wind power. Additionally to such windmills, made any size, which are intended to rotatably float on a suitable body of water. Additionally to such windmills for propelling boats or ships.

Present energy sources have various disadvantages. Nonrenewable fossil fuels, as well as causing pollution and other environmental problems, escalate in cost as supplies became depleted. The subsequent use of nuclear fuels, as well as producing extremely dangerous radioactive wastes not adequately or economically disposed of, provide by-products useful only to the proliferation of nuclear bombs and world-wide annihilation.

In total contrast, the relatively unused available surface wind is completely without any of these problems (or hazards). The problem is that windmills commonly employed hertofore are, in general, inappropriate to the winds overall real nature and accessibility; and accordingly such windmills are inadequate respective to extensive utilization of the wind energy resource. More specifically, such windmills inorder to achieve suitable cost effective operation, and even when representing engineering proficiency and high technology, are dependent upon unrealistic and/or generally non-existant optimum conditions of; virtually uninterrupted, uniform, 15 to 35 mph relatively undirectional and never overly sever wind. Furthermore, such wind must exist at location sites that provide a solid foundation, are free of nearby obstacles, are relatively remote and are of otherwise substantial requirements (besides presence of wind).

Despite the absense of the above described optimum wind (or location sites) and/or the deficiencies of the state of the art heretofore, the real wind (which real wind is fundamentally opposite in nature to said optimum) exists in sufficient abundance to supply all the energy currently used several times over, and this vast energy is readily available in needed extensive amounts (i.e. amounts comparable to present energy consumption) by use of windmills which are appropriate thereto, such as the invention as disclosed here-in.

Windmills of the particular type which this present invention is most related represent several potential advanatages over the more conventional fan or propeller types usually employed. These advantages include omnidirectional responsiveness to wind, high static torque even in relatively low wind, and greater overall safety. However, a characteristic problem is that, particularly when they are approaching into the wind and thereby encountering substantially increased windspeed, the active wind responsive surfaces utilize by these windmills (as well as producing drag) become unstable, difficult to control, and highly vulnerable to unwanted wind induced motions including uncontrolled gybing motions or random flapping motions, etc. Heretofore the said active surfaces themselves and/or together with devices associated therewith needed to overcome these problems were prohibitively massive, unwielding, complex, expensive, or impracticable. Accordingly, such windmills were unable, or even less able than more conventional types, to achieve cost effective utilization of wind energy. These and otherwise disadvantages, as well as disadvantages of windmills perse, are ovecome by the present invention herein disclosed.

The principal object of this invention is to provide a superior energy source by means of an improved windmill of indicated type which windmill is more appropriate to the real nature of the wind energy resource and/or which is cost effective relatively independent of optimum wind conditions, optimum location of placement or it's mounting upon a high tower. A further object is to make possible harmoniously, individual energy self sufficiency as well as social interdependence and/or mutual co-operation, by means of windmills of indicated type which can provide power independently as well as collectively. A further object is to provide a superior, safe, and less centralized energy system which can be secured without immense capital sums and exotic highly-specialized technical skills or equipment, by means of windmills which are cost effective when used individually (constructed in small sizes), as well as when constructed in vast size to supply power to many individuals, and which windmill is inexpensive and undemanding; in design, in construction and in principal: which windmill is completely safe when made in any size; which windmill is powerful, highly efficient, and which automatically utilizes to the fullest extent wind currents in any form and from any direction; which windmill can be easily constructed, and maintained; which windmill is expendable and/or easily and quickly repaired with commonly available and inexpensive materials; which windmill can be easily and quickly assembled from a kit; which windmill can be easily and quickly installed; which windmill can be easily transported; which windmill is strong and rugged in construction but also very low mass and/or very high power to mass ratio; which windmill can be easily and economically manufactured; which windmill is self-protecting in excessive winds; which windmill is effective and without adverse effects when mounted, with or without, a tower on the roof of an occupied household even in relatively low wind residential areas; which windmill can efficiently generate electricity without need of a step-up transmission even when used to drive inexpensive alternators of the type used in automobiles, and which windmill is able to produce efficiently and inexpensively, electricity in a form interfaceable with existing or constructed electricitical utility lines. Another object of the invention is to provide a more efficient means of utilizing wind to propel ships or boats. Yet another object is to provide a windmill easily mounted off-shore or at sea. Yet another object is to provide a source of power for off-shore drilling platforms, remote oil pump jacks, or otherwise remotely located power dependent devices. Yet another object is to provide a source of power which is also more appropriate to low income or less technically developed areas.

These objects and advantages, and the accomplishment thereof not attained by windmills of this, or any other type heretofore, will become readily apparent upon consideration of the accompaning drawings, and ensuing descriptions thereof, and together with the associated discussions as follows: Where in;

FIG. 1 Is an isometric view of a preferred embodiment

FIG. 2 Is a top view of the device as shown in FIG. 1 intended to better show the action of the sails in relation to air flow FIG. 3 Is an isometric view of a second embodiment FIG. 4 Is a top view of the device as shown in FIG. 3 intended to show the action of the sails in relation to air flow FIG. 5 Is an isometric view of a third embodiment FIG. 6 Is a top view of the device as shown in FIG. 5 intended to better show the action of the sails in relation to air flow FIG. 7 Is an isometric view of a fourth embodiment FIG. 8 Is a top view of the device as shown in FIG. 7 intended to better show the action of the sails in relation to air flow FIG. 9 Is an isometric view of a fifth embodiment FIG. 10 Is a top view of the device as shown in FIG. 9 intended to better Show the action of the sails in relation to air flow FIG. 11 Is a side view of the embodiment shown in FIG. 9

FIG. 12 Is a partial detailed view of a means to drive generators

FIG. 13 Is a partial detailed top view of means to drivingly connect generators to the rotation of the windmill FIG. 14 Is a side view of FIG. 13

FIG. 15 Is a detailed top view of the spar and associated devices

FIG. 16 Is an isometric detailed partial view of the windmill vane better showing the sails and associated devices FIG. 17 Is a top view of FIG. 16

FIG. 18 Is a partial view of a spar and associated devices

Figure 1:
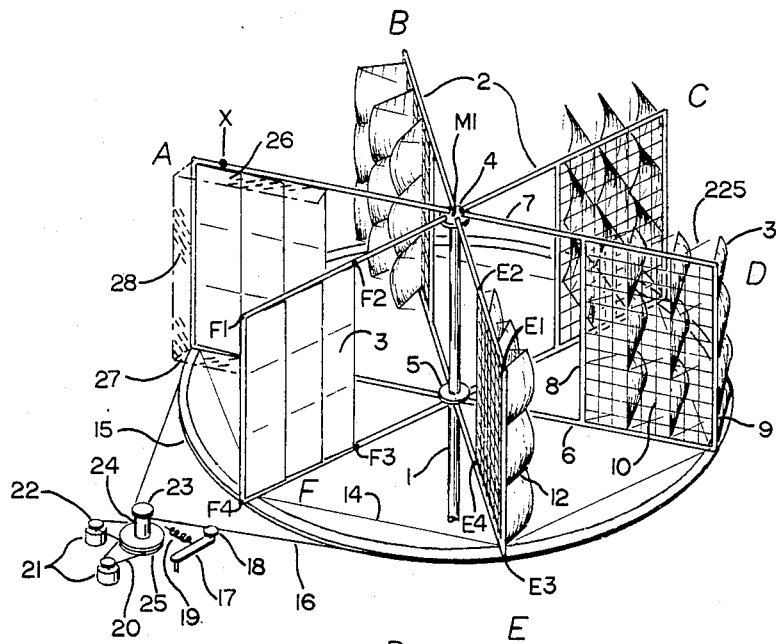

FIG. 25 Showing a location of placement of the windmill on the roof of a house and mounted on a tower FIG. 26 Showing a location of placement of the windmill on the roof of a building and upon a flattened hilltop In all, five embodiments of this invention are disclosed. Shown also are six different means of mounting and/or means to drivingly connect the five embodiments to electical power generation devices. Although each of the said six means is shown in the drawings associated with a particular embodiment this should not construed as necessarily the particular means preferred to that particular embodiment i.e. generally, it is intended that any of the said six means shown can be used together with any of the said five embodiments. Also shown are four examples of optimum and/or intended specific locations of mounting or placement of the windmill in any of its embodiments. The said five embodiments differ in various respects but according to the particular motions of their sails (3), can be classified into two types. The first type, as shown in FIG. 1, FIG. 2, FIG. 3, and FIG. 4 utilize sails which are connected to pivot on a vertical axis and which can swing in a 90° arc (approximately.) The second type, and shown in FIG. 5 through FIG. 10 utilize instead, said sails which can swing in an 180° arc (approximately). All embodiments, means of mounting, and locations of placement are primarily intended for use to generate electricity and in a form interfaceable with and/or which can be electrically connected to existing (or constructed) electrical utility power lines.

Reference is now made more specifically to the accompanying drawings FIG. 1 wherein it is shown that the device consists of a radial framework (2) of six identical vanes mounted on a suitable vertical supporting member, shaft, beam, or mast (1). Any number of such vanes can be used, however three to eight vanes are preferred and more particularly four to six. The vertical member, hereafter termed the main mast can be itself free to rotate upon suitable mounting bearings with said vanes rigidly affixed thereto or the main mast can be firmly fixed and suitable bearings and fittings located thereupon at hub (4) and hub (5), either means for the singular purpose that the vanes can freely rotate in Unison in a horizontal plane about a center or central axis. Suitable reinforcement cables or guy wires (14) (others not shown) of sufficient strength, number, and well placed in accordance with the art, as connecting between F1 and E3, E2 and F3, F1 and E1, F2 and E2, F4 and E4, F2 and E4, F4 and E2, F3 and M1, and between the corresponding points of each of the other vanes., are included to prevent independent movement of the vanes and to provide, a sturdy, strong and rigid structure with low mass. The main mast (1) should be substantial, preferrably iron or steel pipe. However, the main mast according to this embodiment, need not be of a strength sufficient to transmit the torque produced by this windmill, as power is extracted from the rim (as later discussed) nor of sufficient strength to support, the maximum possible force of the wind upon the structrue, as in sever wind the windmill is allowed to freely rotate, out of the winds way, (as later discussed). The framework of each vane, consisting of rigid members (6), (7), (8), (9), should be as lightweight as possible and preferably made of aluminum or aluminum alloy tubing or otherwise weather resistant lightweight material such as wood adequately varnished or bamboo.

Supported by the framework of each vane and connect to the framework by any suitable means is a suitable supporting means for the sails termed a grid. The grid (10) can be of any construction or materials which little impededs air flow there through and is strong, lightweight, and weather resistant, such as consisting of horizontally or vertically aligned (preferrably vertical) wood slats, metal or fiber cables, rope, metal or plastic tubing, bamboo, or which consist of a screen or net like structure, termed a screen grid, such as common fishing net or twisted or welded wire fencing. The preferred grid according to this embodiment, is a screen grid, made of small diameter perpendicular welded wire with 2 to 6 inch spacing. Commmon welded wire fencing of similar construction can be used and is inexpensive, and readily available. For greater efficiency the frame of each vane can include flat baffle structures (26), (27), (28) shown outlined in phantom in FIG. 1A and FIG. 2A, which better confine and direct wind to the grid. With such baffels in place each vane then more resembles a cup or box, with the grid for a bottom and with the open end facing into the wind. Such baffles can be made of any suitable lighweight material or construction which is sufficiently strong and rigid to withstand the force of the wind.

The structure so far described should be only very slightly, or not at all, effected by the wind. The desired operation is obtained by connecting to one side (only) of each grid overlapping sheets of thin flexible material (3). The said sheets, hereafter referred to as sails are connected along one of their longer edges to some of the horizontal wires of the screen grid or, as best shown in FIG. 16 and FIG. 17, are connected along one of their longer edges to some of the vertical wires of the grid and so as to freely pivot about said point of connection to the grid and are of a width sufficient to overlap to a minimal degree when flat aginst the grid. According to the present embodiment the said pivot or hinge consists of folding over the edge of the sail in sections and loosely enclosing there-in one vertical or horizontal wire of the grid, prior to fastening together by sewing, stapling, or otherwise, the overlapped area. Suitable means such as plastic tubes (not shown) placed around the wire and thus between the wire and sail can be included to reduce wear. Included with and connected to the sails are various devices here-in referred to as rigging, which rigging includes low mass relatively less flexible members (12) placed at regular intervals along and perpendicular to the longer length of the sails, at best shown, in FIG. 16. The said relatively less flexible stiff members here-after termed spars provide several functions including preventing the sails from folding and according to this embodiment (together with suitable spar movement limit means) the restricting of the motion of the sails to (approximately) a 90° arc. A key function of these devices (i.e. rigging) is later explained.

It is readily apparent that the configuration of sails affixed to a grid along some of the horizontal wires or along some of the vertical wires as best shown in FIG. 16 and FIG. 17 and above described allows wind to pass through the vanes relatively unimpeded in one direction (indicated by arrow in A in FIG. 16 and FIG. 17) but is entirely stopped and therefore pushes against the vane, when attempting to flow in the opposite direction (indicated by arrow B, FIG. 16 and FIG. 17) and that this property is due solely to an automatic wind-induced movement of the sails. Readily apparent also is that the direction of relatively unimpeded air flow through each vane is reversed if or when the vane is turned over, or in this case, turned 180° about a axis (221) shown in FIG. 16. Consequently, when exposed to wind and when such a vane or vanes rotates about said axis (221) FIG. 16 or about the windmill central axis (1) FIG. 1, the vane or vanes on one side only of the axis will be pushed by the force of the wind, thereby causing the windmill to rotate. According to this embodiment rotation is in the direction indicated by the arrow, FIG. 2, and is always in the same direction regardless of wind direction because wind of any direction which opposes rotation in the indicated direction passes through the vane relatively unimpeded while the wind of otherwise direction is stopped thereby and thus pushed against the vane. In fact, wind even of several different directions at once i.e. random turbulence (in the area incompassed by the vanes) will cause rotation in the same indicated direction, and with almost equal efficiency as caused by uniform wind. This responsiveness to non-uniform wind is particularly advantageous to the mounting or placement of this windmill, without a tower, upon a roof of a low building or household, which location is not recommended for most windmills due to the turbulence usually present.

With reference again to FIG. 16 and FIG. 17, it is further readily apparent that due to the ensuing reinforcing action of the grid, the sails and spars need not be of strength sufficient to alone prevent wind through the configuration. The sails and spars therefore can be made of relatively less expensive and/or less massive materials. Suitable materials for the sails include dacron, thin plastic sheeting, lightweight sailcloth, lightweight tarp canvas, or other weatherproofed fabric. The spar (12) can be made of any resilient material which is of suitable strength, lightweight, weather resistant and relatively stiff, such as plastic, wood, bamboo, or thin spring metal. However, particular attention must be given to the mentioned key function of the rigging of the sails. Without suitable rigging which provides the mentioned key function, the sails, when open (i.e. when not pushed flat against the grid) and/or when travelling into the wind as at D, FIG. 2, will tend to flap randomly or uncontrollable, preventing their efficient and/or desired operation. Suitable rigging, respective to in particular the said key function, in general, consists of any suitable device(s) (i.e. rigging) which can cause, allow, or induce, the sails to become corrugated form arches, "billow" or otherwise simularly modify then when open. Properly carried out the arching, billowing or simular modification introduces into the sails a rigidity (or strength) sufficient to prevent the above referred to unwonted motions. According to the present embodiment this is accomplished as follows. The spar movement limit means, as cord (225) FIG. 17, by their limiting action introduces a bias to cause the spares, hense that part of the sail adjacent thereto to take up a position different from the bulk of the sail (i.e. closer to the grid) when the sails are fully opened, consequently the sails from arches along their length as shown. Resilient means can be also included, as spring (230) FIG. 15, to exert a small force causing the spars, at any degree of opening of the sails, to take positions closer to the grid than the bulk of the sail thus always causing the sails to be arched. When the sails are connected to pivot on a horizontal axis and which swing downwardly to the closed position, instead of said resilient means, the weight of the spar, or extra weight affixed there-to, can provide this function. The said resilient means or said weight are such as to apply only a minimal amount of force in order that the sails do not remain closed and/or so that they open sufficiently to prevent unnecessary drag. The spars, are affixed to the sails by any suitable means such as staples or, although not required for successful operation in general use, can be loosely affixed, such as by metal rings connected to the sails and which rings loosely incircle the spars, or folds of the sail which loosely enclose therein the spars. When loosely affixed to the spars the sails can be moved by any suitable means toward the grid along the spar and crumpled up, i.e. furled, making the sails inoperative. Cord (225) FIG. (17) is passed through a small hole in the sail and forms a loose fitting loop (240) about the spar allowing it to also slip toward the grid when the sail is furled and the sail is more rigidly affixed to spar only at point (239) by suitable fasteners.

Figure 19:
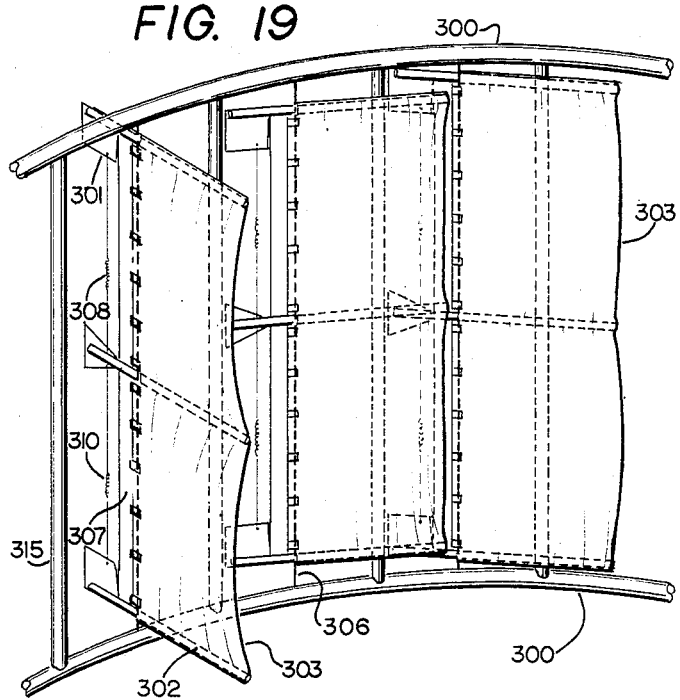
FIG. 19 Is a detailed partial view of alternate types of sails and associated devices FIG. 20 Is a top view of the sail shown in FIG. 19

The spars when made sufficiently strong can include counterweights to prevent the effects of centrifugal force when the sails are connected to pivot on a vertical axis as later described, however, due to the generally very low RPM of the windmill even in high end, and use of lightweight sails and spars, counterweights are usually unnecessary, or the weight of the unmodified spars such can be used to provide a means of biasing the spars. Four spars are shown in each sail, however the number of spars used will depend upon various factors including the particular properties of the sail material and generally the spars should be placed closer together when using lightest weight sail. The spars can be connected to the grid, other than by the sail, by a suitable loosely fitting hinge arrangement such as shown in FIG. 15, consisting of a strap (226) made of leather, plastic or similarly material, which strap is rigidly affixed to the end of the spar by means such as staples or screws (231). The hinge according to this embodiment must allow the ends of the spars away from the grid to move slightly up and down as required by the changeable distance between their said ends due to the manor of the desired arching of the sails. The desired operation of the spars is achieved by means such as shown in FIG. 15, where-in it is shown that cord (225) is connected to the spar then passes through guide tube (227) which is ridgidly affixed to the grid as by wires (228). The cord then connects to a suitable device limiting the movement of the spar, such as a wire ring (229) which is too large to pass through the guide tube. A stretched spring (230) or elastic cord is connected from the ring (229) to the grid, for providing the said desired tensional force on the spar. The necessary strength and/or mass of the spars can be reduced by using two or more such cords, guides, and springs affixed at different points to each spar. Another means to provide the desired tensional force on the spar consist of spring (220) containing a wire of the grid as shown in FIG. 18, which spring also is a hinge connecting the spar to the grid. Yet another means which causes the sail to arch and/or causes the spar and the part of the sail adjacent thereto, to always take up a position different from the bulk of the sail utilizes a fin (301) placed as shown in FIG. 19 and later explained. The movement of the spar can be instead limited by cord (221) FIG. 18 connected to the spar and to the grid or by other suitable means.

Unlike most windmills of this basic type, motive torque is produced by a combination of several means, which means provide motive torque throughout a cross sectional area a width greater than the radius of the windmill, i.e. approximately the entire cross sectional area of the windmill provides motive power and, each vane produces motive torque through a sector of approximately 270° of its rotation about the central axis. In principle, this is accomplished, generally, in the same way that sailing vessels are able to navigate a circular course in wind of one constant direction.

Figure 2:
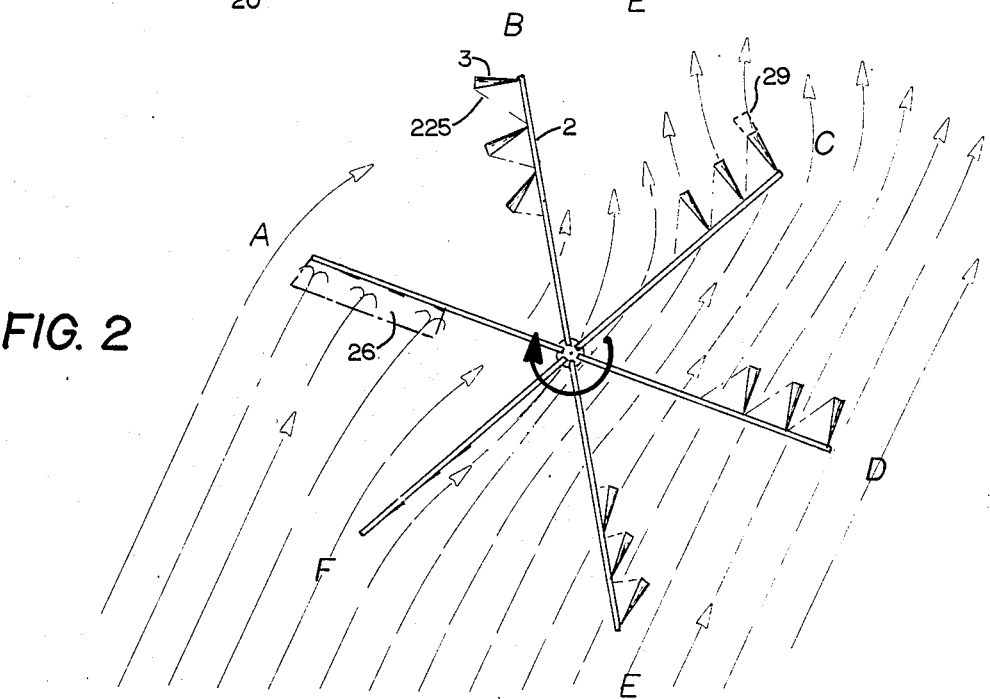
Figure 3:
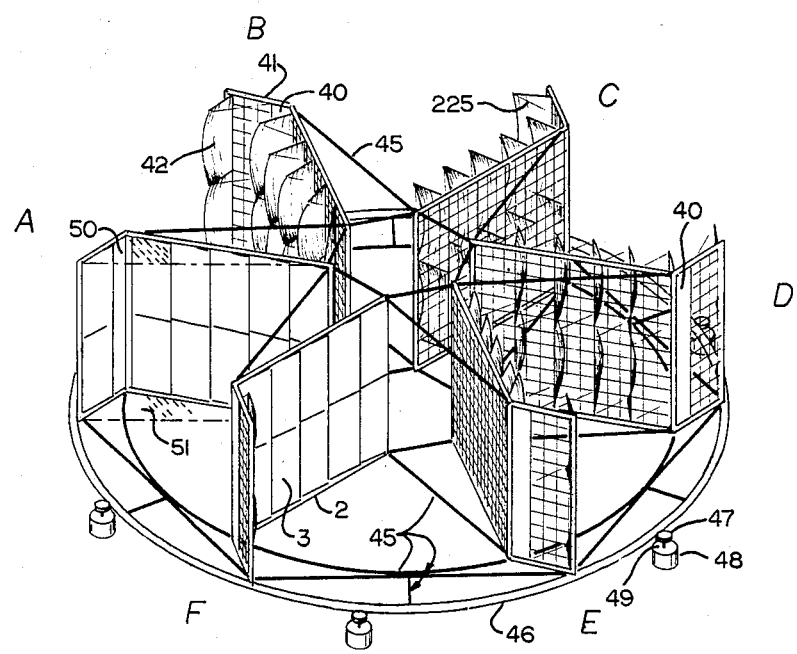
Figure 4:
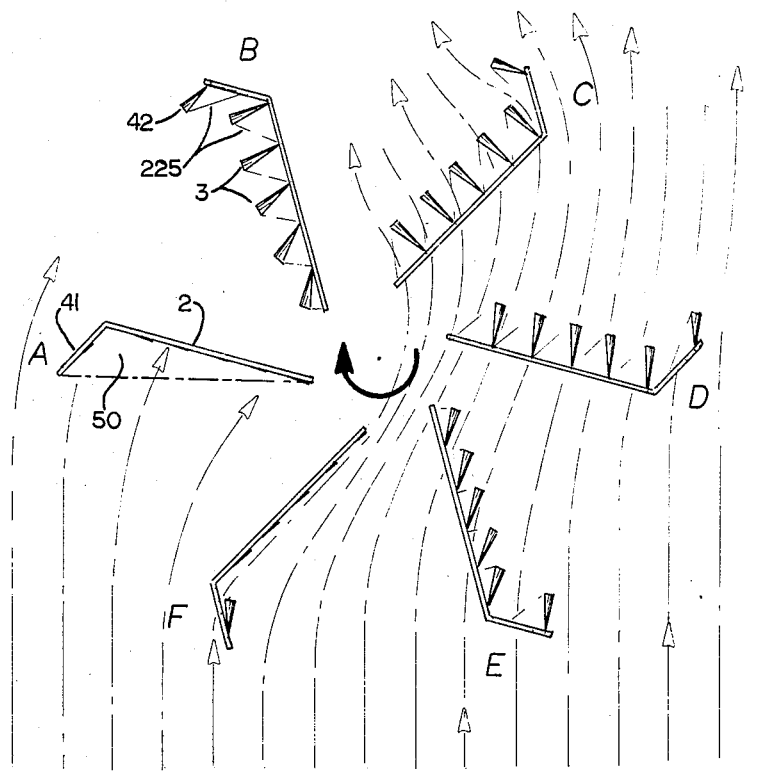

With reference to FIG. 2 it is shown that: at Position A the sails are forced flat against the vane, stopping wind flow there-through and thereby providing motive torque about the central axis in the direction indicated by the arrow: at Position B the vane is idling; at Position C the wind is diverted by the underside of the sails providing motive torque also in the direction shown; at Position D the vane is idling: at Position E the vane can also produce beneficial torque, at Position F the vane is affording two beneficial actions. First, it provides motive torque also in the direction shown because of the way wind is redirected thereby, Second, the wind thereby redirected is then more effectively directed toward the vane at Position C. Subsequently, the vane at Position C provides greater motive torque than would otherwise be expected i.e. the vanes also supplement each other's beneficial effects. Thus with a single device motive torque is provided by a combination of several different means as above referred to, and accordingly unusually high efficiency is easily obtained by this arrangement even without cirtical or exacting design, and even by use of as few as two vanes. Efficiency is further increased without sacrificing simplicity by including flat baffle members as mentioned, by extending each vane by including a jib, later explained, or by use of the other embodiments discussed in the following:

A second embodiment which also uses sails which are connected to pivot on a vertical axis and that can swing in approximately a 90° arc is shown in FIG. 3 and FIG. 4. This embodiment differs from the first only in relative positioning of the vanes. It is designed to maximise the above mentioned interaction of the vanes which is accomplished by their offset from the purely radial arrangement as previously shown in FIG. 1. The greater interaction is indicated in FIG. 4 where-in it is shown that wind diverted by the vane at F is better directed toward the vane at C, which as explained, increases the motive torque porduced thereby. Shown included with each vane and extending its radial length (but not necessarily required) is a smaller section (41) above referred to as a jib. The sail or Sails there upon (42) are referred to as the jibsail(s). The jib according to this embodiment utilizes a single sail allowed to swing in an arc of approximate 150° and baffle (40). Said baffle is unmoveable respective to the grid and is included to provide a spacing between the jib sail (42) and the adjacent vane sail inorder to reduce their possible contact with each other during operation. The jib structure can instead utilize several narrower sails, which sails can be rigged as shown in FIG. 19 and later described, or provided with other suitable sail arrangements here-in disclosed. The vane together with the jib as shown in this embodiment provides a more cuplike shape increasing the effect of wind thereupon and thus providing greater motive torque. Efficiency is further increased using flat rigid baffel members (50) and (51) included at the top and bottom of each vane framework as shown in phantom on the vane at Position A FIG. 3 and FIG. 4.

Figure 5:
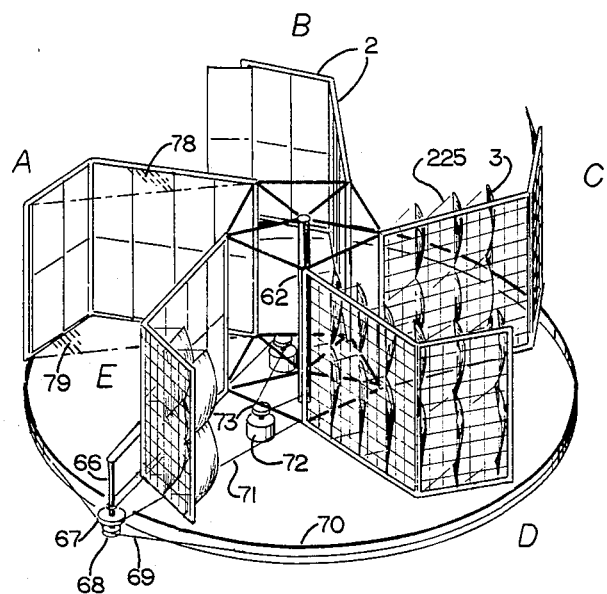
Figure 6:
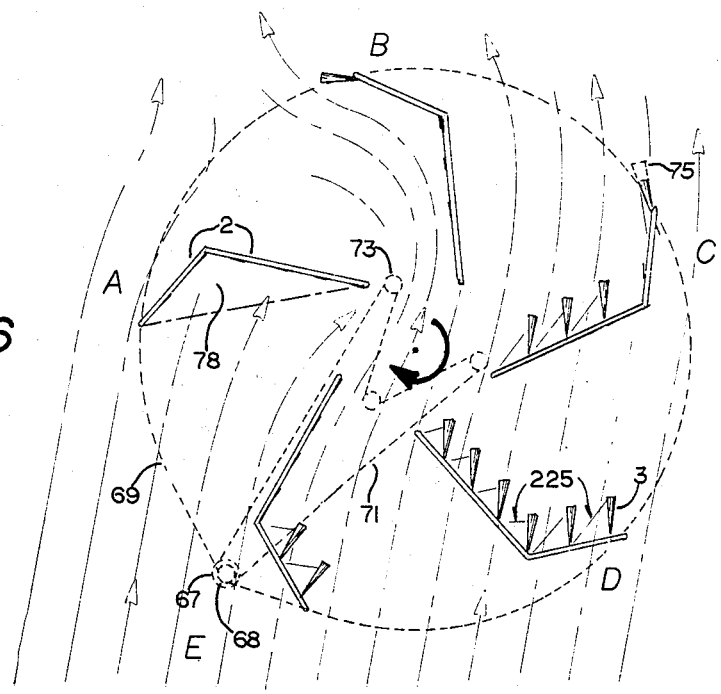

Shown in FIG. 5 and FIG. 6 is still another embodiment. This third embodiment differs from the previous embodiments in two main respects. First, the sails are not limited to movement in approximately a 90° arc, but instead are allowed to move through approximately a 180° arc, (i.e. the ring (229) FIG. 18 or similar limiting device is omitted). Second, the vanes are shaped and arranged so as to provide a beneficial interaction of a form differing from that previously mentioned. The interaction of the vanes is understood with consideration of air flow lines indicated in FIG. 6 wherein it is shown that the wind is diverted more particularly into the central area of the structure (by the vane at Position E) and collected therefrom and again redirected (by the vane in Position B). Motive torque is provided by the vane at B, and the vane at E, as well as by the vane at Position A.

As shown, the sails contact the grid on either side of their pivot point, thus the grid also provides the function previously obtained by limiting the spars to a 90° arc and accordingly the required strength of the spars, sails and cords is reduced. Although it is similar in appearance, and includes if necessary, a rigid baffel to reduce possible contact between the sails, the smaller section of each vane is not considered as a separate structure (or termed a jib) as it is an intregal, or necessary part of the operation of the vane. This embodiment also can include flat baffels (78) and (79) shown in phantom to further increase efficiency.

Figure 7:
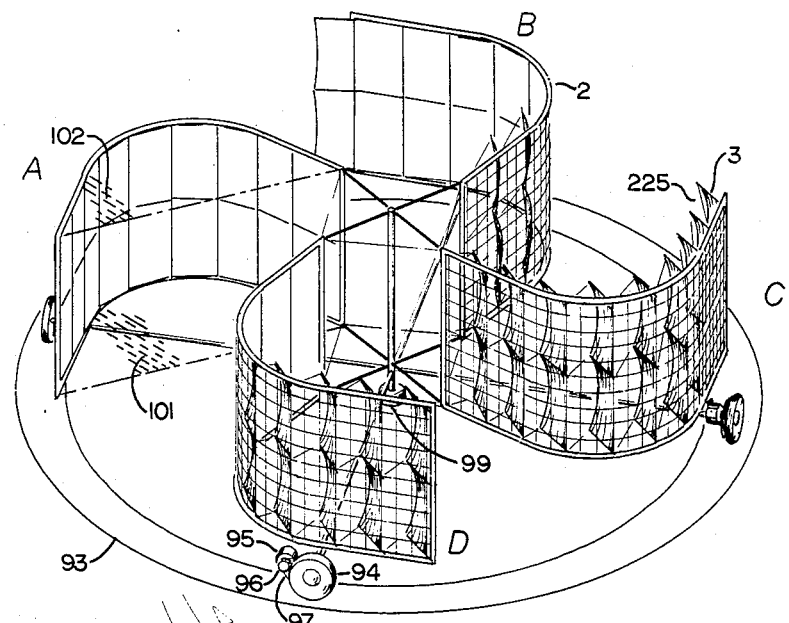
Figure 8:
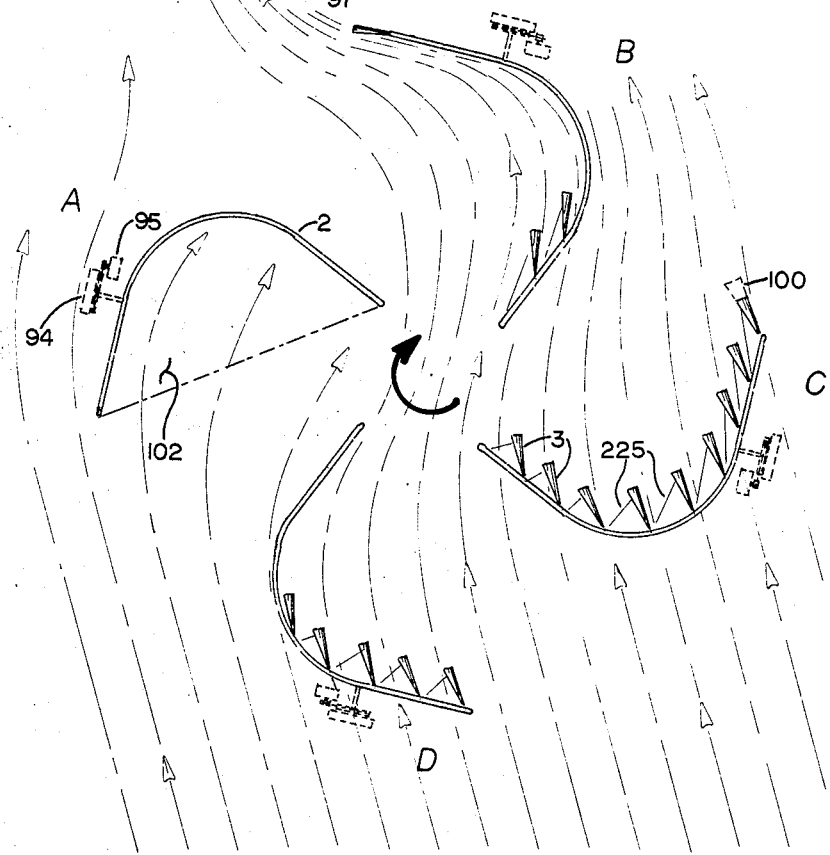
Figure 22:
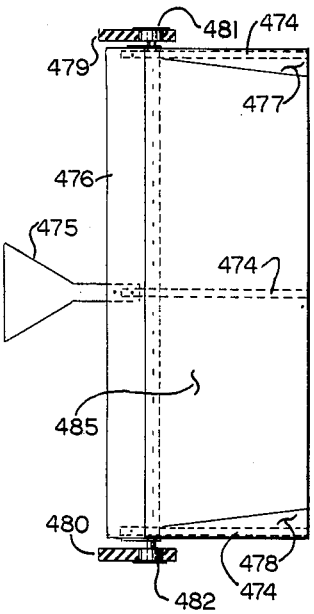
FIG. 22 Is a side view of an alternate type of sail

Yet another embodiment is shown in FIG. 7 and FIG. 8. This fourth embodiment differs from the previous embodiment only in the number and shape of the vanes, which shape being curved, affords greater efficiency and is thus preferable in low wind areas. The curved vanes can be constructed, utilizing several narrow flat sections with each section constructed as shown in FIG. 1, previously described, and the sections suitably connected together, or by means of a more rigid screen grid, such as made from aluminum tubing or large diameter rods. Curved vanes, which include a relatively flexible screen grid and sails with rigging as shown in FIG. 16, can also be constructed by including with the framework rigid vertical members (315) as shown in FIG. 19, termed struts. The struts are placed along the curved sections of the vanes adjacent to each sail pivotial connection. The grid is connected to said struts as by wires which incircle said strut and the adjacent vertical wire of the grid, and so connected along the entire length of the strut. The grid then forming several flat areas (between the struts) and which flat areas, taken together, form the desired curved shape, as shown. The curved vanes are also constructed utilizing sails as shown in FIG. 19 and FIG. 22, later discussed. Flat baffel members (102) and (101) shown in phantom can be included with each vane to increase efficiency as previously described.

Yet another embodiment is shown in FIG. 9 and FIG. 10, which differs from the previous embodiment only in the shape, relative size, relative position, and number of vanes. Flat baffel members (126) and (127) can be included with each vane, to futher increase efficiency.

Figure 20:
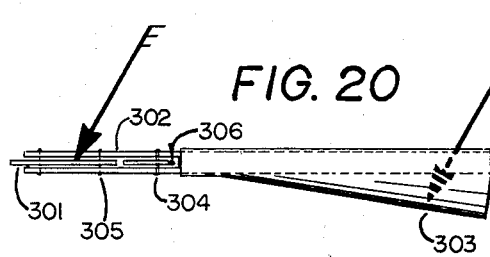
Figure 21:
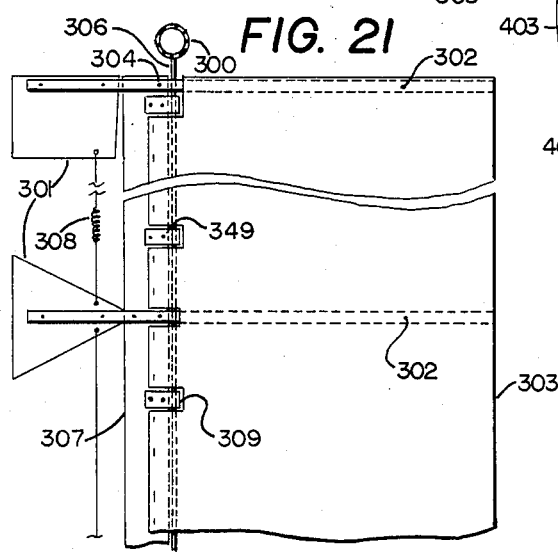
FIG. 21 Is a detailed side view of partial section of the sail shown in FIG. 20

Shown in FIG. 19, FIG. 20, and FIG. 21 is an alternate construction of the sails. Such sails do not need to overlap in the manner as in previous embodiments, thus reducing their possible contact with each other as might occur due to their independent movement. The possible leakage of wind through the gaps there inbetween is instead reduced by including a thin strip of more rigid material (307) affixed to the spars where they are extended through the grid, as best shown in FIGS. 19 and 21. According to this rigging the necessary arching of the sail previously explained is accomplished by the fins (301) connected to the spars beyond said thin strip (307). These fins are positioned so that the force of the wind acting thereupon always has the opposite effect respective to the spar (302) as does the wind acting upon the sail, as indicated in FIG. 20. The wind thereby always tends to move the spar to a position different that the bulk of the sail and thus to cause the sail to arch or billow in the manner as previously shown. Spring (308) prevents the top spar from tilting downward due to it's weight and spring (310) FIG. 19, connected to the lower most spar, keeps the sail taut. According to this embodiment the sail structure is connected to the grid by plyable "U" shaped loops made of leather or similar material (309) affixed to strip (307) by rivits (349) which loops loosely enclose a cable (306) wire, pipe, or rod of the grid. The said strip and fins are constructed of fiberglass, plastic, or other suitable lightweight stiff, but not brittle, material. The spars (302) which are of more rugged construction than above described i.e. which do not bend appreciably during normal operation are slotted and allowed to pivot at the point of connection to the strip (307) on pin or bolt (304). The fin is affixed to the spar by any suitable means such as bolts (305). The combined weight of the spars, fins, strip and sail should be such as to balance about the pivot point with the grid, so that the sails are unaffected by centrifugal force. The grid as shown in FIG. 19, termed a strut grid, consist of rigid vertical members (315) of suitable strength, termed struts and vertical ropes or cables (306) of conventional types which support the sail structures. Struts alone can form the grid when sails as shown in FIG. 16 are used and such sails can be affixed to said struts as by staples or similar means. The sails can pivot respective to the grid due to the bending of the sail material adjacent to the point of connection to said strut.

Shown in FIG. 22 is another sail structure. The spars (474) are rigidly affixed to a rotatable strut (476) and which spars according to this embodiment do not pivot respective to said rotatable strut. The rotatable strut has a flatened cross-section and can rotate respective to the vane framework on bearing (481) and (482). Said bearings are mounted on the vane framework (479) and (480) shown in cross section. The said rotatable strut thus serves the function as the cable (306) and the thin strip (307) shown in FIG. 19. A strut as shown in FIG. 19 is included between each sail structure to reinforce the vane. A single fin (475) instead of a fin on each spar is utilized and each sail (485) includes the triangular shaped portions (477) and (478). Said triangular portions of the sails are made of elastic material which allow the sail to billow in the same manor as before with-out need of the spars being able to pivot respective to said rotatable strut. The sail and elastic material is affixed to the rotatable strut and the spars by any suitable means. Such sails can be made entirely of elastic material or can be connected to said spars by means as springs. The alternate sail and grid configurations as above descirbed, require spars and sails of greater strength than as required when a screen grid is used.

To further increase the efficiency of the windmill in the embodiments shown in FIG. 1, FIG. 5, FIG. 7, and FIG. 9 the outermost sails can be made wider than as needed for them to overlap when flat against the grid, as indicated in the phantom (29) FIG. 2, (75) FIG. 6, (100) FIG. 8, and (128) FIG. 10. Greater motive torque is provided thereby, particularly when the vane is positioned at C in FIG. 2 and at the corresponding positions in the other embodiments. Although the sails move independently even in approximately a 180° arc, their movements are highly efficient, smooth and in unison without need of controlling devices. The sails do not tend to collide with each other, always automatically close in the same direction and otherwise opperate as desired due to their relationship to the wind as the windmill rotates. With reference, for example, to FIG. 10, it is shown that as the sails move from fully open (position E) to fully closed (position A) they are induced by the wind to all close in the same direction and even though at position C the sails are fully closed in the op osite direction. From position A to position C the sails also rotate approximately 180° but again their motions, although not necessarly as smooth as from Position C to Position A, are automatically induced by the wind to close in the same direction and experience no, or only minimal contact with each other. The vain being essentially radial causes the outermost sail to rotate first then the next outermost, and so on, due to the higher relative wind speeds experienced by the circumference of the rotating windmill structure. However, in areas characterized by very high turbulance the embodiments with sails restricted to a 90° arc, as shown in FIG. 1 and FIG. 3, are preferred.

The windmill embodiments can be constructed to any desired diameter; however, in order to take fullest advantage of such structures, particularly their very low cost and low mass, they should be made as large in diameter as possible, or at least 16 feet in diameter. The relatively large diameter and proportionally large vane area provides high power output and cost effective operation even in relatively low wind and/or in wind which is otherwise insufficient to drive any other windmills. The large diameter also provides cost effective operation without a tower for height and in low wind areas or when the windmill is mounted on the roof of a low structure and/or on a low structure where-in nearby wind reducing obstacles such as trees or other such objects are present. However, the large diameter is also desireable for several other important reasons made readily apparent here-in, as follows.

With reference again to FIG. 1, it is shown that associated with the windmill is a means to drive generators, at high RPM, utilizing belts and pulleys (unless otherwise indicated, hereinafter, the term generator is used to indicate any mechanically driven electrical generating device.) A circular rim (15) of proper diameter, termed rim pulley, is mounted as shown in FIG. 1 with the lower part of the radial framework of the windmill providing the spokes of the pulley. A belt, rope, or chain (16) connectes therefrom to a small pulley (23).

As mentioned, the windmill and hence rim pulley is of large diameter, the pulley (23) being very much smaller in diameter, (3 to 10 inches). Therefore, alone, provides a very high step-up gear ratio. The small pulley (23) can drive directly a generator on a common shaft, or inorder to further increase generator RPM, pulley (23) can drive a third pulley (25), on the same shaft which in turn drives a second belt(s) (20) which drive a fourth pulley(s) (22) mounted directly to generator(s) (21). Belt (16) can consist of a rope of an ordinary kind in a suitable length and with its' ends suitable spliced together, if a full 360° loop about pulley (23) is included, to prevent slippage. A suitable means is included to keep the belt (16) (or chain, or rope) taut, as consisting of a idler pulley (18), spring (19) and tension arm (17).

Associated with the second embodiment shown in FIG. 2 and FIG. 3 is a second means to drive a generator(s) at high RPM without need of a conventional step-up transmission. A vertical member is not utilized for rotatable support of this embodiment; instead, the windmill is rotatably mounted, as well as drivingly connected, utilizing a suitable rim rail (46) mounted similarly as the previously described rim pulley and in contact with at least 3 well placed suitable wheels (47) of small diameter. Said wheels are mounted on generator driveshafts (49) and the generator housings (48) are firmly affixed to a platform or firmly anchored. To further increase driven RPM, the wheels (47) can be used to drive generators through additional grears or belts. Suitable supporting members such as aluminum tubing (45) together with guy wires (not shown) are included to reinforce the structure and rim rail as necessary to provide a structure supportable thereby. Various means, well-known to the art, can be used to provide suitable transfer of power from the rim rail to wheels (47) and which means also adequately rotatably support and anchor the structure. Shown in FIG. 14 is a frictional means, which utilizes a clamping action to rim rail (46) provided by outwardly pushing springs (173) and (179) and generator drive shaft pulleys (171) and (181). Instead of two generators (182) and (180) as shown, only one can be used with the other replaced by a suitable idler pulley mounted on a shaft, which shaft is affixed to pivot (176), or two said idler pulleys can be used, one or both of which can drive generator(s) though additional gearing or pulleys. The mounting bracket (174), as best shown viewed from above, FIG. 13, also prevents sideways movement of the generators or idler pulley shaft, which shaft includes brace (185) shown in phantom. Said springs (173) and (179), and pivots (176) and (177), provide the necessary free play to insure adequate contact with the rim rail at all times. Base (175) is anchored securely to any desired mounting location, and any required number of such devices, shown in FIG. 14, can be used and placed equal distances apart around the circumference of the windmill.

Figure 24:
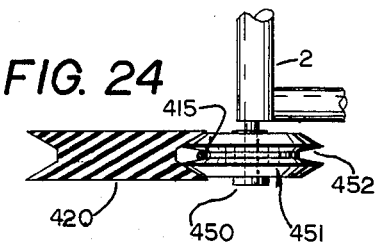
FIG. 24 Is a partial detail side view of devices employed to utilize wind gusts

It is also feasable, to instead, mount the generators and wheels (171) and (181) on the rotating windmill structure, and with the rim rail instead firmly affixed to a foundation, platform, flat roof, or otherwise mounting location such as the tower shown in FIG. 24B.

Yet another means to drive one or more generators is shown in FIG. 5 and FIG. 6. The generator(s) (72) are instead mounted on the rotating windmill body and rim pulley (70) is, instead, ridgidly affixed beneath the windmill to a platform, flat roof, or otherwise foundation (not shown). The main mast (62) is also mounted to said foundation and is the same as shown in FIG. 1. Belt (69) rotates small pulley (68), which in turn rotates pulley (67) of common shaft (66) which drives belt (71) which belt in turn drives generator(s) (72) by small pulley (73). Three identical generators are shown, however, any number can be used, and/or otherwise located on the windmill.

Yet another means to mount the windmill and drive generators at high RPM without a conventional type of step-up transmission, is shown associated with the windmill as embodied in FIG. 7 and FIG. 8. The windmill structure is securely held in position by a bearing (99) to a secure foundation and allowed to rotate supported by three or more rotatable wheels (94) suitably mounted there-to. As the windmill rotates said wheels roll due to frictional contact on a suitable circular roadway, or track (93), which track is common to said secure foundation or bearing (99). One or more generators (95) are mounted on the rotating windmill body and drivingly connected to said rotating wheels by suitable means such as gears, chain (97) and sprocket (96), or belt and pulley. So mounted, the windmill (in any embodiment) can very easily be made very large or virtually unlimited in diameter and located upon a suitable flattened hilltop as shown in FIG. 26, A or in smaller sizes, easily and quickly mounted on the top of a building or otherwise structure with a flat roof, as also shown in FIG. 26, B. Possible slippage of the wheels can be prevented by including weights mounted above the wheels or when the windmill is made smaller in diameter, by a downward force applied by bearing (99), or by other suitable means. The common automobile, truck, bicycle or trailer, etc. tires, wheels, hubs and/or axles can be used without modification. Suitable structors can be included so that said wheels (and generators) can then be mounted some distance below the vains inorder to increase the height of the windmill. When the windmill is made relatively very large in diameter (i.e. more than 50') and thus with very low maximum and operating RPM, relatively massive generators can be mounted on the rotating windmill body without adverse effect, and which mass can also prevent slippage of the wheels when mounted as shown in FIG. 7. Also when made sufficiently large, and particularly when mounted on said wheels on a flattened hilltop, otherwise lightweight construction is less needed, and the cost of such structures can be thereby further reduced.

A doubling of the effective generator driven RPM without use of step-up gears can be achieved if the generator is instead rotatably mounted, and the driving force applied so as to counter rotate said generator and said generator drive shaft. For example if a generator is rotatably mounted and a pulley of the same size as mounted to the drive shaft is affixed thereto, then using two belts instead of one, with a rim pulley as shown in FIG. 1, and with said belts connected to said pulleys so as to counter rotate them, the generator RPM is thereby doubled.

A second means which can be used to double the effective driven RPM without using step-up gearing is shown in FIG. 12. Two windmills of the type here-in disclosed, are mounted on a common main mast, or otherwise stacked one on top of the other. The sails of one windmill are oppositely placed respective to the grids thereby causing the two windmills to always rotate in opposite directions. When one of said windmills is drivingly connected to the drive shaft (armature) and the other windmill to the housing (stator) of a generator, (which housing is rotatably mounted as previoudly mentioned), or by means as shown in FIG. 12 with the generator (194) affixed to one of the windmills and the drive shaft of the generator drivingly connected to the other windmill. Then the effective step-up gear ratio is thereby doubled and further the said generator can be operated without being mounted to a stationary foundation or anchor. The windmill at the top of FIG. 12, with sails (197) shown, is rotatably mounted by bearing (198) and (200) said bearings being mounted between pipe (199) and shaft (205), and which windmill includes, (instead of a rim pulley, which could be used) a toothed rim (or rim gear) (204) which drives small gear (191) (instead of a small pulley which could be used) which said small gear is connected to the drive shaft (192) of generator (194). The generator is mounted to the frame of windmill B by brackets (193) and (195). Windmill B rotates on mounting bearings (201) and (202) fitted in pipe (203). The RPM of the driven devices can be further increased, i.e. mutiplied by four, by the combination of the means previously mentioned, with two counter rotating windmills, (as shown in FIG. 12) connected so as to counter rotate the generators.

Another means of mounting the windmill where a body of water is available, or anywhere at sea is depicted in FIG. 9 wherein it is shown that the windmill is rotatably supported solely by a suitable buoyant circular pontune (122). Suitable submerged impellers (125) mounted at, or near, windmill's outermost circumference are employed to drive generators (123) of common shaft (125) at high RPM without need of a step-up transmission, clutch, or otherwise devices.

Many generators in common use, including most commercial generators, must rotate at a specific RPM in order to produce 60 cps alternating current or a desired voltage. Particular to the mounting of the windmill upon a body of water, as above described, such generators can be directly operated at a constant desired RPM very easily by means which employ the mentioned submerged impeller (125), and which impeller is modified to include blades of controlable pitch. The pitch can be automatically adjusted according to the variable speed of rotation of the windmill (i.e. velocity of water relative to the impeller) inorder to produce any desired drive shaft RPM. Any drive shaft RPM can also be achieved by means where-in a fixed pitch impeller is mounted inside of a submerged shroud or scoop, which shroud or scoop includes an adjustable water intake valve. Various automatic means, well known to the art can be used to provide the said adjustments.

A chain, cable (154) or other suitable connecting means is connected by a pivot (153) to the center of rotation of the windmill and to anchor (155) in order to anchor the windmill to any desired location as shown in FIG. 11. Submerged cable (156) transmits power from generators (123) to shore or otherwise location needing electrical power. Also shown in FIG. 11, is a supporting pontune (157) of an alternate shape, i.e. which has a circular cross section, and which is mounted some distance below the vanes thereby increasing their height. Mounted as described the windmill is virtually without frictional drag, or step-up transmission losses and off shore or at sea the windmill diameter (and thus the power output) is virtually unlimited.

The said means as described above as well as any means wherein the generator(s) are mounted on the rotating windmill body and thus rotated therewith must, of course, include suitable, centrally located, brushes and slip rings (or similar devices) to allow electrical power to be transmitted from the windmill. Brushes and slip-rings of the types well known to the art are adequate.

All such means to drive generators so far discussed depend on the relatively large diameter of the windmill, thus, the largest possible diameter is desireable also in order to provide the high gear ratio possible with such means. For example, a rim pulley 24 feet in diameter connected by belt to a 3 inch pulley (or wheel) provides a gear ratio of 96:1. Thus, even though the windmill is rotating, for example, at only 10 RPM in a 25 M.P.H. wind, and no other step-up means are used, the small pulley (23) FIG. 1; wheel or pulley (68), FIG. 5; (or similarly in principle submerged impeller, 125) is driven at 960 RPM; or at 1920 RPM (960×2) if the generator is counter rotated as mentioned; or 3840 RPM (960×4) if two counter rotating windmills and counter rotated generators are used as previously discussed. Fundamentally, the larger in diameter the windmill is made, the lower is it's operating RPM, but the higher is the gear ratio thereby provided. Therefore, the disadvantage of low RPM (generally encountered respective to generating electricity) is made up for while the advantages of low windmill RPM, as also mentioned, are retained.

Figure 23:
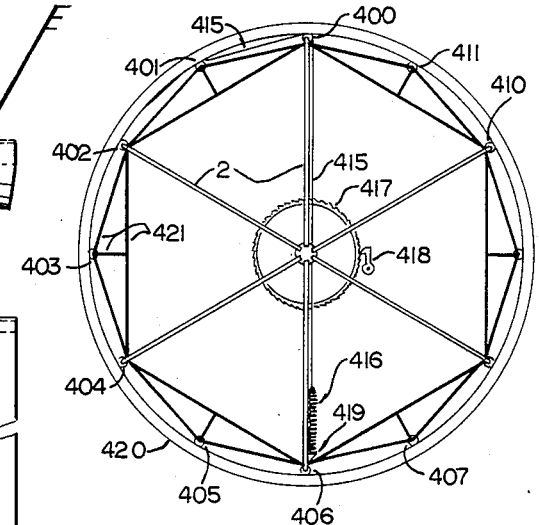
FIG. 23 Is a top view of the windmill modified to utilize wind gusts

This windmill, in all embodiments discussed, is capable of producing extremely high static torque (in high wind). For example, when made 24' in diameter, this torque can exceed (approximately) 6000 lb/ft in a 50 MPH wind. Possible damage can be avoided by including a slip clutch (24) FIG. 1, of conventional type and installed so as to allow, for example, pulley 23, FIG. 1 or similar driven part to turn freely when the driving force exceeds design limits. The windmill is thereby allowed to temporarily rotate freely at it's maximum possible RPM in response to a sudden wind gust. However, windmills made very large and/or massive, must be made sufficiently strong to withstand sudden wind gusts because inertia prevents the windmill's sudden response thereto, irregardless of the use of the said slip clutch. A means as shown in FIG. 23 can be used with windmills of low mass to provide protection from sudden high wind gusts as well as recovering and utilizing the energy thereof, which energy is otherwise lost due to the slip clutch. The rim rail or rim pulley (400), as previously mentioned, is mounted so as to be able to rotate respective to the windmill vains except as restricted by cable (415) connected to spring (416). Said spring is connected to the windmill vains by bracket (419). A sudden wind gust stretches said spring and a suitable means such as ratchet wheel (417), and catch (418), also included, prevents the windmill vains from rotating backwards, thus the generators are rotated after the wind gust has passed by the recoiling spring. The slip clutch previously mentioned is utilized to provide slipage only in sustained excessive winds. The rim pulley is secured to, and rotatable respective to the vains (2) of the windmill by means as wheels (400–411) mounted on said vains and structors (421) by suitable bearings. Said wheels (400–404) best shown in FIG. 24, include pulley (452) for cable (415) which pulley is rotatable on bearing (451) mounted on said wheel. Said ratchet wheel (417) is securely mounted to the windmill vains (2) and said catch (418) is mounted to a secure foundation, the said catch can include means as rubber pads to reduce noise.

Another characteristic advantage of this invention in all embodiments is that wind which is at some time decreasing in speed is not then pushed faster by a fan-like action of the windmill during the time when the windmill is rotating due to it's previously gained inertia. Such losses are entailed by conventional fan or propeller windmills when driven by intermittent or gusty wind. These losses do not occur because if the windmill as herein disclosed is at some time rotating faster than the driving wind, the sails do not at any time close (or become flat against the grid). With the sails open, air can pass through the structure relatively unimpeded, therefore, the windmill will continue to rotate by virtue of it's stored inertia, even if the driving wind suddenly stops completely, and the windmill is slowed only by the driven load. This property (i.e. no fan-like action), allows power to be extracted efficiency in wind otherwise considered to be of the most unwanted character, i.e. gusty wind which only suddenly blows, then suddenly stops in a more or less cyclic fashion. Such wind is not to uncommon next to a household or similar structure, immediately above the roof of a residential household, above other relatively low structures which are surrounded by wind effecting obstacles, or similar locations where a windmill might be placed.

Uninterrupted power can be provided by the wind when the electrical energy produced is interfaced with (or connected to) existing or constructed utility lines, and when such lines incompass a sufficiently large area containing a sufficient number of such windmills so connected together. The probability is then great that at any given time a relatively constant power is entering the utility line, even though at any particular location the wind is unpredictably intermittent. Thus all windmills, irregardless of size or location, etc., should provide electrical power which is identical to all other windmills and/or of a form which is interfaceable with the existing electrical power lines.

This invention can also be utilized to provide a superior means of propelling sailing vessels. Heretofore sailing vessels required constant re-orientation of the sails according to wind direction, were unable to move at all in calms, could not proceed directly into the wind, and could approach into the wind only in a zigzag course. The zigzag course required, termed tracking, increases the distance traveled and/or time required. A sailing vessel, instead, provided with the windmill and generator as herein disclosed, and various other parts, can overcome these disadvantages. Said other parts include a means of storing electrical energy, such as a sufficient number of re-chargeable batteries and an electrical driving means such as a suitable electric motor drivingly connected to a submerged propeller. When a sailing vessel so equipped is traveling any direction other than directly into the wind, or when anchored (and wind is present), the windmill produces excess electrical energy which is used to charge said batteries. The batteries, thereby charged, then can provide motive power in calms and the ability to proceed directly into the wind. As the windmill is omnidirectionally responsive to wind, no attention to it is required irregardless of wind direction (or wind direction relative to the desired course of the vessel) Further, the vessel speed is made relatively independent of moment to moment wind velocity. Further, such crafts do not require persons highly experienced and/or skilled at sailing for their efficient operation. Such means of propulsion, being completely silent, is also particularly useful for fishing vessels of any size. Such means further, could completely eleminate noise pollution on and about recreational lakes, as well as reducing hazards and/or otherwise annoyances common to gasoline power boats.

The invention has been described with respect to various embodiments therof means of mounting, locations of placement, means of connection of driven devices and intended uses. It will be apparent to those skilled in the art that further embodiments, modifications, and improvements may be practiced without departing in any way from the spirit of the invention. Thus, it is to be understood that all matter herein is to be interpreted merely as illustrative and not in a limiting sense.

What is claimed is:

1. A vertical-axis feathering windmill, comprising:
    (a) at least one open framework vane;
    (b) at least one flexible sheet having at least one vertical edge, said sheet rotatably held on said framework along one said edge;
    (c) spar means for each said sheet, comprising a plurality of resilient horizontal members attached in spaced equidistant relationship along the vertical length of said sheet and attached so that the sheet is able to billow between spars; and
    (d) resilient means between the sheet and spar combination and its corresponding framework vane biasing said sheet and spar combination towards the framework such that wind on the leeward side of the windmill adds to its rotation, said sheet and spar combination otherwise pivotable by the wind.

2. A feathering windmill according to claim 1 wherein said resilient means includes a limiting action, thereby limiting the rotation of each said spar of at least one of said sheets so that the sheet and spar combination is held at a position for optimum angle of attack for maximum lift when the vane is moving cross wind in Position C, FIGS. 1-2 and there-abouts and in the corresponding positions in FIGS. 3-10, and when the windmill is rotating at the intended speed relative to the wind speed.

3. A windmill according to claim 1 in which the framework includes a screen grid consisting of a plurality of aligned, uniformly positioned, filament memebers, forming a mesh, said filament members being made from materials selected from the group consisting of steelwire, rustproof itom wire, aluminum wire, nylon filament, fiberglass filament, hemp, and synthetic resins, and in which said flexible sheet is mounted on and along the length of one of said filaments by pivotal connecting means, and a plurality of said sheets are each mounted by pivotal connecting means on filaments chosen so as to place the sheets in parallel alignment and spaced apart so as to overlap when the sheets are rotated thereabout into positions flat against the grid.

4. A windmill according to claim 3 in which the said sheets are connected to said grid by pivotal connecting means consisting of a fold at the edge of the sheet which encloses there-in a filament of the grid with the overlapping area of the fold fastened together by suitable fasteners.

5. A feathering windmill comprising:
(a) at least one open framework vane supporting a screen grid;
(b) at least one flexible sheet restrained by said screen grid, said sheet rotatably held on said screen grid along one edge of said sheet;
(c) spar means for each said sheet comprising of a plurality of resilient members attached in spaced equidistant relationship along the length of said sheet, and attached so that the sheet is able to billow between spars; and
(d) biasing means associated with each said spar biasing the sheet and spar combination towards the screen grid so that the sheet is caused to billow between spars by wind moving through the screen grid, said sheet and spar combination other wise pivotable by the wind except as restrained by the screen grid.

6. A windmill according to claim 5 in which said flexible sheet has at least one edge which is essentially perpendicular to the windmill axial center of rotation with said sheet rotatably held on said screen grid along one said edge.

7. A windmill according to claim 5 in which said flexible sheet has at least one edge which is essentially parallel to the windmill axial center of rotation with said sheet rotatably held on said screen grid along one said edge and in which said biasing means biases said sheet and spar combination towards the screen-grid such that wind on the leeward side of the windmill adds to its rotation.

8. An air flow device, comprising:
(a) a open framework supporting a screen grid;
(b) at least one flexible sheet restrained by said screen grid, said sheet rotatably held on said screen grid along one edge of said sheet;
(c) spar means for each said sheet comprising of a plurality of resilient members attached in spaced equidistant relationship along the length of said sheet, and attached so that the sheet is able to billow between spars; and
(d) biasing means associated with each said spar, biasing the sheet and spar combination towards the screen grid so that the sheet is caused to billow between spars by wind moving through the screen grid, said sheet and spar combination other wise pivotable by the wind except as restrained by the screen grid.

9. An air flow device accordingly to claim 8 in which fin means project from at least one spar, said fin means acted on by the wind to oppose the winds action on the sheet so that the sheet is caused to billow between spars by wind moving through the screen grid.

10. A feathering windmill comprising:
(a) at least one open framework vane;
(b) at least one flexible sheet, said sheet being substantially rectangular and rotatably held on said open framework along one of its longer edges;
(c) spar means for each said sheet comprising of a plurality of resilient members attached in spaced equidistant relationship along the inner length of said sheet; and
(d) biasing means associated with each said spar biasing the sheet and spar combination so that the sheet is caused to billow by wind moving through the corresponding framework vane, said sheet and spar combination other wise pivotable by the wind except as restrained by the said framework.

11. A windmill according to claim 10 where-in said spars are sufficiently stiff so that they do not bend appreciably during normal operation.

12. A feathering windmill according to claim 11 where-in said bias means comprises a fin means projecting from each said spar, said fin means acted on by the wind to oppose the wind's action on the sheet and thereby causing the sheet to billow between spars.

13. A windmill according to claim 10 where-in at least one of said spars has sufficient compliance so that it can bend into a suitable curve at times during normal operation, said curve being contained in a plane which is perpendicular to the rotatable axis of the corresponding sheet.

14. A feathering windmill according to claim 10 where-in the sails are rotatably connected on an axis which is parallel to the windmill central axis and said bias means includes the centrifugal force acting on said spars of suitable mass.

15. A feathering windmill according to claim 10 where-in the sails are rotatably connected on a horizontal axis and said bias means comprises gravitational force acting on said spars of suitable weight.

16. A windmill according to claim 10 with a diameter of more than 20 feet, each vane there-of having a multiplicity of said sheets, each said sheet being substantially rectangular and rotatably connected along one of its longer edges, the shorter edges of the widest sheets measuring less than 24 inches and which sheets overlap by at least 1".

17. A windmill according to claim 16 in which the widest of said sheets have shorter edges measuring less than 10 inches.

18. A windmill according to claim 3 in which the said spars are connected to said grid by a henge means afixed to each spar.

19. A windmill according to claim 10 in which said vanes there-of afford an unobstructed path for wind through the central area of the windmill and in which wind, by at least one windward vane, is thereby directed toward and passes through the central area of the windmill to be collected there-from and thereby redirected by at least one leeward vane, and such that the wind acts on each of said vanes to promote the rotation of the windmill.

20. A windmill according to claim 10 in which said open framework vanes define a curved plane, said curve having a tangent which is parallel to the relative wind and in which the sheets can rotate into the closed position on either side of their pivotal connection to the framework such that the sheets in the closed position form a continuous surface vane upon which the wind produces forces promoting the rotation of the windmill.

21. A feathering windmill according to claim 10 further comprising a rim power take off means drivingly coupled, disingageable, to at least one driven device said driven device there-by directly driven at substantially higher RPM than the RPM of the windmill.

22. A windmill according to claim 21 in which said means is rotatable respective to the said vanes about the axial center of the windmill except as restrained therefrom by a resilient means for storing energy of a wind gust, which energy is later released to driven devices and in which said windmill vanes include means which prevent said vanes from rotating backwards from as rotated by the driving wind.

23. A windmill according to claim 10 which further comprises of rim means mounted on the windmill and a plurality of wheel means mounted to a foundation, said wheel means engaging said rim means for rotatively mounting and supporting the windmill.

24. A windmill according to claim 23 further comprising at least one driven device which is coupled to at least one of said wheels, said driven device being thereby directly driven at a substantially higher RPM than the RPM of the windmill.

25. A feathering windmill according to claim 10 further comprising; a plurality of wheels of common types with resilient tires which are rotatively mounted on the windmill and which roll from frictional contact on a suitable surface for rotatively supporting the windmill, a central bearing means for rotatively securing and supporting the windmill in position, and at least one driven device carried by the windmill which is drivingly coupled to at least one of said wheels.

26. A feathering windmill according to claim 10 further comprising of a buoyant means for rotatably floating the windmill on a body of water, at least one driven device mounted on and carried by the windmill, a submerged adjustable impeller means for driving said driven device at a constant RPM, and a pivotially connected anchor means for securing the windmill in place.

* * * * *